United States Patent
Hetzler et al.

(10) Patent No.: US 6,950,265 B2
(45) Date of Patent: Sep. 27, 2005

(54) METHOD AND APPARATUS FOR SERVO DEFECT MANAGEMENT

(75) Inventors: Steven Robert Hetzler, Los Altos, CA (US); Daniel James Malone, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 309 days.

(21) Appl. No.: 10/272,401

(22) Filed: Oct. 16, 2002

(65) Prior Publication Data

US 2004/0075933 A1 Apr. 22, 2004

(51) Int. Cl.[7] ............................................. G11B 21/02
(52) U.S. Cl. ...................................... 360/75; 360/53
(58) Field of Search .............................. 360/48, 53, 75, 360/77, 77.08, 78.04, 78.14, 40, 31; 371/30, 37.8, 31, 40.1

(56) References Cited

U.S. PATENT DOCUMENTS

| | | | |
|---|---|---|---|
| 4,135,217 A | 1/1979 | Jacques et al. ............... 360/77 |
| 4,412,165 A | 10/1983 | Case et al. .................. 318/636 |
| 4,616,276 A | 10/1986 | Workman .................... 360/77 |
| 5,271,018 A | 12/1993 | Chan ......................... 371/10.2 |
| 5,438,559 A | 8/1995 | Best et al. ................... 369/54 |
| 5,500,848 A | 3/1996 | Best et al. ................. 369/275.3 |
| 5,523,903 A | 6/1996 | Hetzler et al. ............ 360/77.08 |
| 5,583,842 A | 12/1996 | Wilson et al. ............... 369/54 |
| 5,615,190 A | 3/1997 | Best et al. .................... 369/58 |
| 5,748,401 A | 5/1998 | Kawai ...................... 360/78.14 |
| 5,768,044 A | 6/1998 | Hetzler et al. ............ 360/77.08 |
| 5,798,883 A * | 8/1998 | Kim ........................... 360/31 |
| 5,822,142 A | 10/1998 | Hicken ........................ 360/53 |
| 5,890,209 A | 3/1999 | Dobbek ...................... 711/112 |
| 5,995,308 A | 11/1999 | Assouad et al. .............. 360/53 |
| 6,025,966 A | 2/2000 | Nemazie et al. ............. 360/53 |
| 6,185,058 B1 | 2/2001 | Dobbek et al. ............... 360/48 |
| 6,201,655 B1 | 3/2001 | Watanabe et al. ............ 360/53 |
| 6,281,676 B1 | 8/2001 | Ottesen et al. .............. 324/212 |
| 6,301,679 B1 | 10/2001 | Tan ........................... 714/723 |
| 6,771,446 B1 * | 8/2004 | Noble ......................... 360/60 |

* cited by examiner

Primary Examiner—David Hudspeth
Assistant Examiner—Jason Olson
(74) Attorney, Agent, or Firm—Walter W. Duft

(57) ABSTRACT

A system and method for managing servo defects in a data storage device. During operation of the device, a servo sector recorded on a medium is identified. A lookup is performed in a servo defect table resource to determine whether the servo sector contains defective servo information. A responsive servo control action is taken if the servo sector is found to contain defective servo information. Media having servo defect information recorded thereon are also disclosed.

66 Claims, 6 Drawing Sheets

400

Virtual Track Table 402

| Address 407 | Value 406 |
|---|---|
| 0 | 0 |
| 1 | 0 |
| 2 | 1 |
| 3 | 3 |
| ... | ... |
| N - 2 | M - 1 |
| N - 1 | (last defect) |

Virtual Servo Table 403

| Address 405 | Value 404 |
|---|---|
| 0 | a |
| 1 | b |
| 2 | c |
| 3 | d |
| ... | ... |
| M - 1 | m |

Figure 4

METHOD AND APPARATUS FOR SERVO DEFECT MANAGEMENT

BACKGROUND OF THE INVENTION

1. Field of the Invention

The present invention relates to data storage devices of the type that write and/or read data on the surface of magnetic, optical, or magneto-optical storage media. More particularly, the invention relates to a system and method for managing defects within the servo regions of data storage media adapted for use in such apparatus.

2. Description of the Prior Art

By way of background, data storage apparatus such as disk and tape drives have transducers (also known as "heads") that read and write data on the surfaces of data storage media that move relative to the transducers in either a rotational mode (disk drives) or a streaming mode (tape drives). The data storage media may be fixed or removable, and they can be adapted for magnetic, optical or magneto-optical data storage.

Servo information is used to maintain highly accurate positional relationships between the transducers and their associated data storage media during data read/write operations. In tape drives, the servo information is commonly recorded in servo sectors that are interspersed with the data regions that store user data on each longitudinal track of the tape media. In analogous fashion, the servo information of disk drives is commonly recorded in servo sectors that are interspersed with the data regions that store user data on each concentric track of the disk media. This is sometimes referred to as sector servo recording. Because the servo sectors are generally placed at the same circumferential locations on each track, they are aligned in servo regions that extend in a cross-track direction. Typically, there are multiple (e.g. 80–90) servo regions per disk.

The servo information on disk and tape media is sometimes prone to error as a result of media defects, recording defects, or a combination of both. Such errors can have a significant effect on storage device performance. For example, if a disk drive transducer is incorrectly positioned while in a track following servo mode due to a servo error, it could write data on an adjacent track and thereby obliterate previously recorded data. Such data losses are generally non-recoverable.

Presently, data storage devices use estimated transducer position as the main mechanism for identifying a defective servo condition. If the transducer position determined from reading servo information in a servo sector does not fall within a predetermined range of the position estimated from prior servo information, the determined transducer position is assumed to be in error. A deficiency of this method is that it is not reliable when the error produced by a servo defect is such that the error falls within the range of the estimated position.

There are methods for providing a storage device with predetermined defect information that accounts for servo sector defects. One method is to detect defective servo sectors during manufacturing and then mark one or more nearby data sectors as unusable. For example, data sectors that immediately precede and follow the defective servo sector on the same track can be marked. In some cases, data sectors on adjacent tracks are marked to provide further protection. Another method of handling servo defects is to apply compensation signals that attempt to correct the defective servo information. In particular, compensation is provided for the servo sector PES (Position Error Signal) bursts used to maintain a transducer over its associated track centerline while in a track-following mode. Both of the foregoing methods have significant disadvantages. For example, marking data regions as unusable reduces available storage media real estate. Compensating for defective servo information assumes that a transducer is already located above a track centerline. If the transducer is not so positioned, the compensation information will be inaccurate. Moreover, the determination of servo compensation information requires sophisticated equipment and is a task reserved for the device manufacturer at drive manufacture time. There is no ability to add to the compensation information should additional servo defects occur in the field.

Methods exist for mapping defects occurring in storage media data regions. Indeed, this is commonly done in so-called "No-ID" data sector disk drives during the conversion of logical addresses specified by a host device to the physical addresses arranged on the media. According to the usual technique, a data sector defect map stored in RAM (Random Access Memory) is used to skip over defective data sectors as the drive formatter electronics perform the address conversions. Although ideal for mapping data defects, this method is not suitable for mapping servo defects. Data is accessed along tracks and conventional data defect mapping techniques are designed to be efficient for locating defects in this manner. Unlike data defects, servo defects do not have precise track locations. As previously stated, servo sectors are adjacently arranged in a cross-track direction. Because track-to-track spacing is generally much less than the spacing between successive servo sectors along a data track, defects that affect a given servo sector are much more likely to affect servo sectors in adjacent tracks than they are to affect servo sectors on the same track.

An alternative servo defect handling method is therefore needed. What would be particularly desirable is a servo defect management scheme wherein servo defects can be identified in advance and used during drive operations to avoid transducer positioning errors. Preferably, the servo defect management scheme will be optimized to make efficient use of drive processing and memory resources. The ability to modify the servo defect information should additional servo defects arise following drive manufacture would also be desirable.

SUMMARY OF THE INVENTION

The foregoing problems are solved and an advance in the art is obtained by an improved system and method for managing servo defects in a data storage device. During operation of the device, a servo sector recorded on a data storage medium is detected or otherwise identified. A lookup is performed in a servo defect table resource to determine whether the identified servo sector contains defective servo information. A responsive servo control action is taken if the servo sector is found to contain defective servo information. The invention further contemplates media having servo defect information recorded thereon for building a servo defect table resource.

The servo defect table resource can be set up to organize defective servo sectors using an HSC servo sector addressing format in order to minimize table lookup time. This servo sector addressing format is based on sector addresses that are defined as numeric values whose most significant elements represent a head number H, whose next lower significant elements represent a servo sector number S along a data track, and whose least significant bits represent a cylinder number C.

Each HSC address defines a virtual track number representing a first field containing the most significant numeric values of the HSC address and a virtual servo number representing a second field containing the least significant numeric values of the HSC address. Each of the virtual track numbers corresponds to a virtual servo track that represents a region of servo sectors extending generally orthogonally across data tracks on the medium, and each of the virtual servo numbers corresponds to a servo sector located in one of the virtual servo tracks.

The servo defect table resource can be organized hierarchically by way of the virtual track numbers and the virtual servo numbers, with each of the virtual servo numbers being associated with one of the virtual track numbers and each of the virtual track numbers being associated with 0 to N-1 virtual servo numbers, where N is a maximum number of servo sectors that may exist on a virtual servo track defined by a virtual track number. In this way, servo sectors that are defective due to a defect that extends along a virtual servo track have virtual servo numbers stored in adjacent locations in the servo defect table resource.

The servo defect table resource can be divided into a Virtual Track Table (VTT) and a Virtual Servo Table (VST). The VTT is indexed by virtual track numbers (VTNs) corresponding to virtual servo tracks. It also stores an address value in association with each VTN that corresponds to a VST table location. The VST stores virtual servo numbers (VSNs) corresponding to defective servo sectors. The VSNs are stored at selected VST table locations identified by the addresses given in the VTT. A difference in a first address value associated with a first VTN in the VTT and a second address value associated with a second VTN that is adjacent to the first VTN in the VTT represents a number of defective VSNs associated with the first VTN. This facilitates rapid table lookups of adjacent servo sectors likely to be compromised by a single defect. It also allows the notion of servo defect "width" to be used as basis for making determinations about servo reliability in relation to the degree of uncertainty in transducer position.

A lookup in the servo defect table resource may include specifying a servo sector address and a current servo mode. The current servo mode can be used to specify a search width that defines a range of servo sectors to be checked in the servo defect table resource. A smallest search width can be used for a track following servo mode, a next larger search width can be used for a settle servo mode, and a largest search width can be used for a seek servo mode. The defective servo information resulting from a lookup in the servo table resource may be formatted in any suitable fashion, including as a bit map that identifies whether the identified servo sector or any of its neighbors within the search width contains a servo defect. This information can be used to ignore a servo sector that lies within a specified cross-track range of transducer position uncertainty for the servo region containing the servo sector.

The servo defect table resource may also store information about servo defect width that is optimized for anticipated servo defect statistics. The servo defect width information can be stored in any suitable portion of the servo defect table, such as the VST. It can be represented by a defect width value or in other ways, such as by defining the VSNs according to HSC addresses in which each cylinder number C represents more than one actual cylinder on the medium.

The servo defect table resource may also store detailed defect information that includes information about a cause or location of a defect in servo sectors corresponding to the VSNs.

The servo defect table resource may also store correction factors for correcting servo information errors caused by a defect in servo sectors corresponding to the VSNs.

An additional feature of the invention is that the responsive servo control action may include using estimated servo information if the identified servo sector is found to contain defective servo information.

Another feature of the invention is that the servo defect table resource may be stored in random access memory and servo defect table information may be stored at one or more locations on the medium.

A still further feature of the invention is that the servo defect table resource may be added to as new servo defects are discovered during operation of the storage device.

BRIEF DESCRIPTION OF THE DRAWINGS

The foregoing and other features and advantages of the invention will be apparent from the following more particular description of exemplary embodiments of the invention, as illustrated in the accompanying Drawings, in which:

FIG. 4 illustrates a servo defect table resource that includes a virtual track table and a virtual sector table that may be used for storing servo sector defect information in accordance with the invention;

DETAILED DESCRIPTION OF PREFERRED EMBODIMENTS

Figure 1:
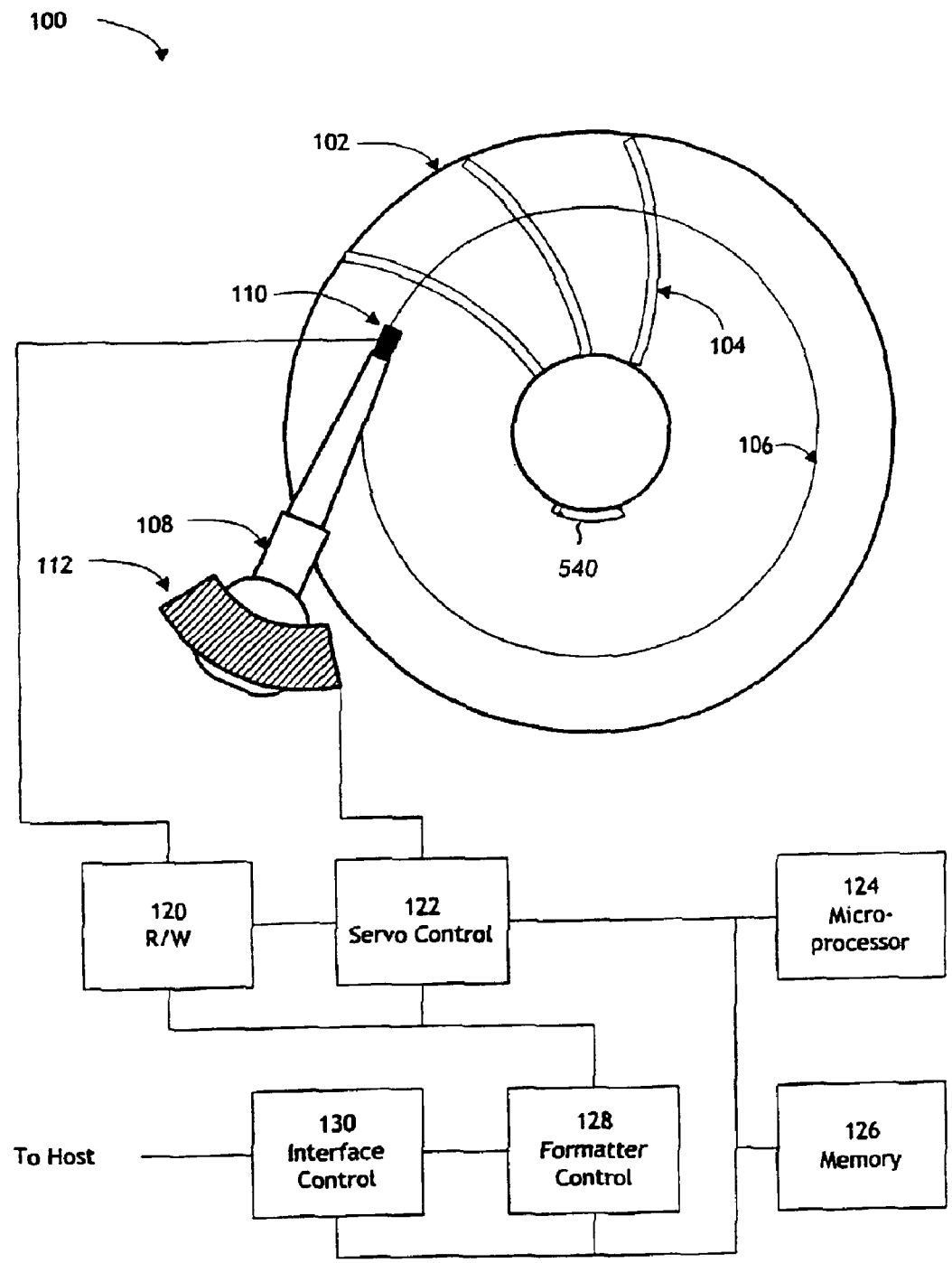
FIG. 1 shows a system block diagram of a basic configuration of a disk drive constructed in accordance with the invention.

Turning now to the figures, wherein like reference numerals represent like elements in all of the several views, the invention will now be described by way of exemplary embodiments within the context of one possible implementation of the invention as a disk drive having one or more non-removable, magnetically encodable storage disks mounted therein. This description is intended to serve as example only, and it should be understood that the principles of the invention could be applied to other storage devices, including but not limited to, disk drives having removable magnetic media, disk drives having removable or non-removable optical or magneto-optical media, and tape drives. As described in more detail below, the invention further contemplates storage media, including disks, tapes or the like, that are encoded with servo defect information, as well as a method for managing defective servo regions using servo defect information.

Shown in FIG. 1 is an exemplary disk drive that is constructed in accordance with the invention. The disk drive, generally indicated at 100, includes a disk 102 whose surface is magnetically encodable and on which servo information is written in servo regions 104. The servo regions 104 extend generally radially across the disk 102, along an arc traced by an actuator 108 as it rotates. Data is stored in data regions on a plurality of concentric tracks, one of which is indicated as 106. The data regions represent the portions of the disk 102 that lie between servo sectors that define the servo region 104.

An actuator 108 mounts a read/write transducer 110 (comprising a read head portion and a write head portion) at its free end. The actuator 108 is rotatably driven by a voice coil motor 112 at its base end, which is pivotably mounted. The disk drive 100 further includes electronics for accessing, reading and writing data on the disk 102 and communicating with a host system (not shown). In particular, a Read/Write channel circuit 120 is coupled to the transducer 110. It also communicates with servo control logic 122 and formatter control logic 128. The disk drive 100 further includes a microprocessor 124, a memory 126 and interface control logic 130.

During drive operation, the servo control logic 122 drives the voice coil motor 112 to position the transducer 110 to affect servo operations, such as seek, settle and track follow. To assist this function, the servo control logic 122 preferably includes logic for estimating the position of the transducer 110 based on previously read servo information, and for using the estimated transducer information in lieu of actual servo information if the actual information is deemed to be unreliable.

Figure 2A:
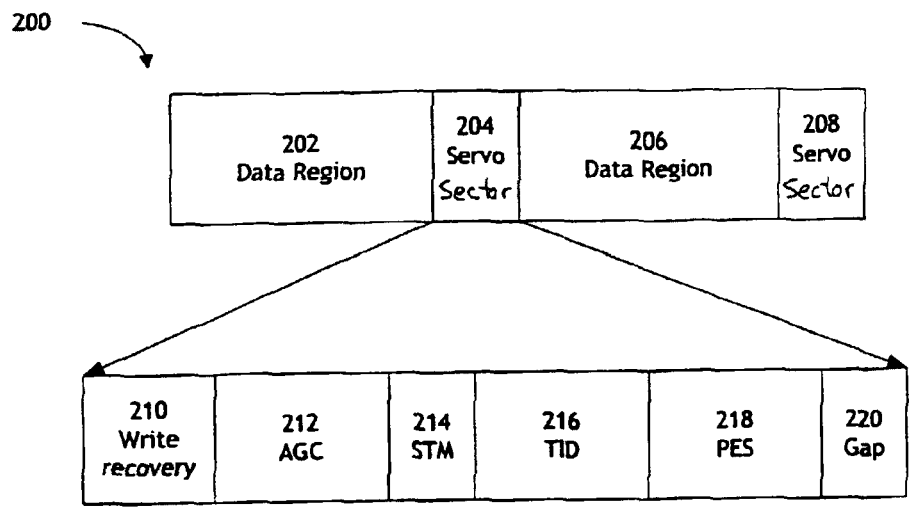
FIG. 2a shows a portion of a track containing servo sectors and data regions, with an expanded view of a servo sector.

With additional reference now to FIG. 2a, a portion of a data track of the disk 102 is indicated generally at 200. The data track portion 200 is shown to include two servo sectors 204 and 208, and two data regions 202 and 206. Transducer position information is located within the servo sectors 204 and 208, and data is located within the data regions 202 and 206. As is well known, the data may be stored in data sectors within the data regions using methods such as split-field recording, headerless recording, etc.

The lower portion of FIG. 2a shows the detail of a typical servo sector using sector 204 as an example. In general, the servo sector 204 may include a write recovery/leading timing gap 210, an automatic gain control field (AGC) 212, a servo timing mark (STM) 214, a track-ID field (TID) 216, a position error signal field (PES) 218, and a trailing timing gap 220. The timing gaps 210 and 220 serve to separate the servo sector 204 from the surrounding data regions. The AGC field 212 is used to set the servo gain and clocking in the servo control logic 122 to allow the reading of the subsequent servo information. The STM 214 provides bit alignment for reading the subsequent servo information. The TID field 216 typically records the track number (coarse position) and other digital information, such as sector number, index and head number. The PES field 218 is designed to provide the fine track positioning information.

Figure 2B:
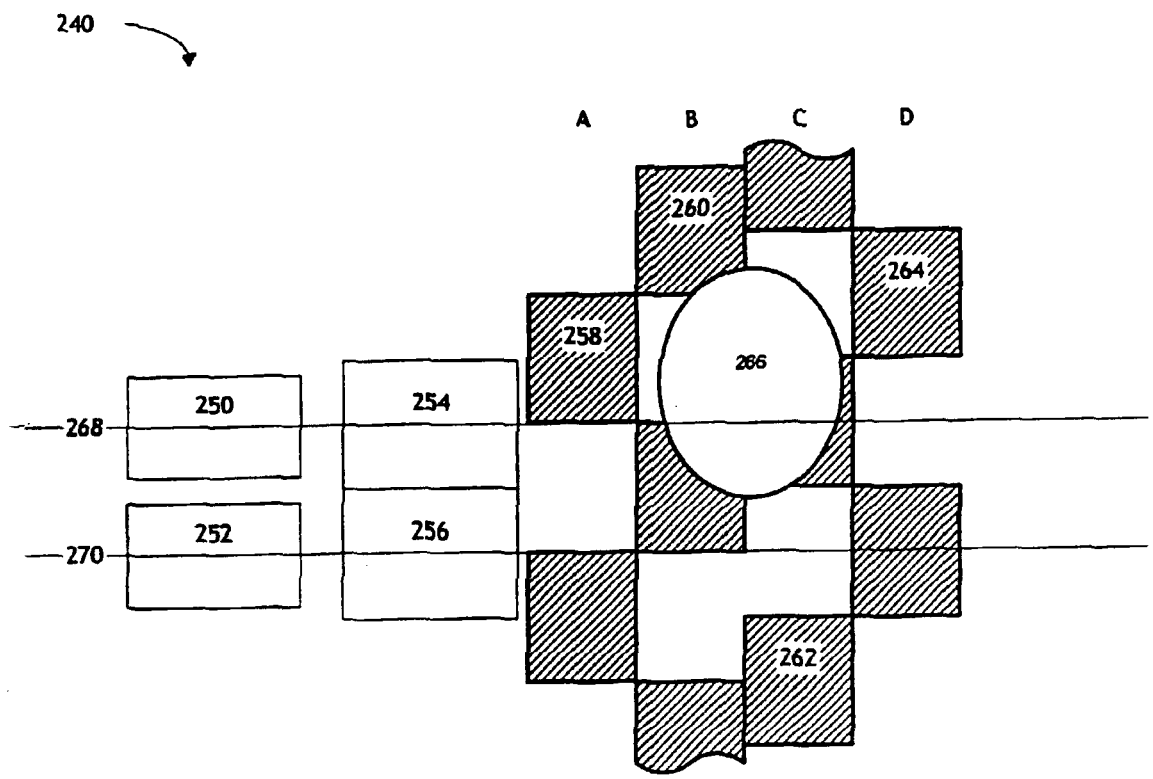
FIG. 2b shows a detailed view of a portion of a disk surface containing a defect in a servo sector.

With additional reference now to FIG. 2b, there is shown a surface portion 240 of the disk 102 representing servo sectors laid out on two adjacent tracks, shown at 250 and 252. The centerline for track 250 is shown at line 268. The centerline for track 252 is shown at line 270. The servo sectors for the tracks 250 and 252 include non-PES information 254 and 256, and PES burst information 258, 260, 262 and 264. The non-PES information 254 is associated with track 250 and the non-PES information 256 is associated with track 252. For purposes of illustration, the PES information is shown using a common quad-burst type pattern. The four phases are shown as A (bursts 258), B (bursts 260), C (bursts 262) and D (bursts 264).

If a defect exists within a servo sector, such as a media defect or a defect due to an error in the servo sector generation process, the servo information may not be read correctly. An example defect 266 is shown to cover part of the PES field of track 250 in FIG. 2b. In general, a defect will have both a lateral (across the track) and longitudinal (along the track) size. Although the defect 266 is shown to be located within a PES field, it could be located anywhere in the servo sector. In the case of the defect shown, it is unlikely that the servo information will provide the correct value when, for example, the read head portion of the transducer 110 (see FIG. 1) is positioned at the track centerline 268 in order to read on the track 250. A similar effect can occur when the read head is used for servo positioning during a write mode. Should the servo information be used in this mode, it is likely that the transducer 110 will become erroneously positioned off-track, possibly leading to serious errors such as writing data in an off-track location. The defect 266 may affect other operations as well. For example, when the read head portion of the transducer 100 is positioned at the track centerline 270 of track 252, it may be affected by the defect 266 if a slight lateral offset brought it within range of the defect. Further, during settle and seek operations, the accuracy of the estimated position is reduced, therefore increasing the lateral range of positions that may be affected by the defect.

In order to avoid the foregoing problems, the present invention allows a data storage device to determine when servo information is unreliable and should therefore not be used for transducer positioning. In particular, a servo defect management scheme is proposed in which servo sectors containing defective servo information are identified for use during servo operations. A defect, such as the defect 266 of FIG. 2b, can thus be noted by marking the servo sector in which it occurs as defective. Moreover, because servo defects can affect neighboring tracks, it is also important to be able to rapidly locate such defects within a specified lateral (cross-track) range. The present invention performs this function.

It will be appreciated that an efficient method for storing and retrieving defect information is important in order to minimize the costs associated with using servo defect information. Because the number of defects is expected to be small compared to the number of servo regions, it is best to store information that is only associated with defective servo regions, and none associated with good servo regions. The present invention contemplates a servo defect table resource that contains such servo defect information.

In a typical disk drive, servo sectors (as well as data sectors) are identified according to the cylinder (C), head (H) and sector (S) numbers. The cylinder number is the cylinder (or track, when referring to a single surface) location of the servo sector and thus provides radial positioning information. The head number indicates the transducer number and thus identifies the disk surface on which the servo sector lies. The servo sector number is the number of the servo sector from a known servo index and thus provides circumferential positioning information. If a CHS addressing scheme was used to generate a servo defect table, inefficiencies would result because adjacent table entries would represent servo sectors aligned sequentially along a track. As discussed above, this is not optimal because servo sectors are much more densely packed in the cross-track direction than in the on-track direction. Defects are thus more likely to affect servo sectors in one radially extending servo region than in multiple servo regions. In exemplary embodiments of the invention, a new scheme is proposed for storing servo sector defects in a servo defect table resource in which the foregoing servo geometry is taken into account.

Figure 3:
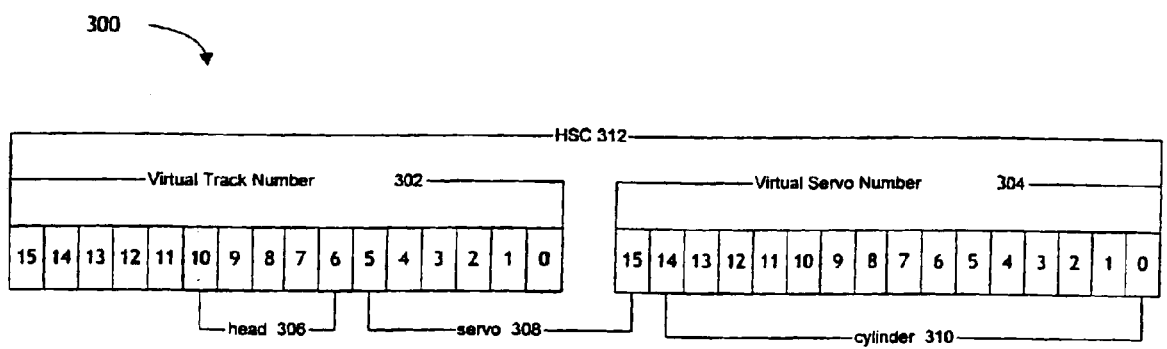
FIG. 3 illustrates the construction of a virtual track number and a virtual sector number from head, servo, and cylinder values generated in accordance with the invention.

FIG. 3 illustrates a construction 300 of an "HSC" value 312 from the (C,H,S) values discussed above. The HSC 312 is allocated a maximum size of 32 bits in FIG. 3. However, in the illustrated example, only a portion of this allocation is utilized. In particular, it is assumed the disk drive cylinder number is a 15-bit value (fewer than 32,769 cylinders), the servo sector number is a 7-bit value (fewer than 129 servo regions per revolution) and the head number is a 4-bit value (fewer than 17 transducers). Of course, these values are just examples, and any values may be used, depending on design preferences. The HSC value 312 is created by concatenating the head, servo and cylinder numbers such that a cylinder number 310 occupies the 15 lowest order bits, a servo number 308 occupies the next 7 higher order bits, and a head number 306 occupies the next 5 higher order bits. In this example, bits 0–14 of the HSC value 312 are the cylinder number, bits 15–21 of the HSC value 312 are the servo sector number, and bits 22–26 of the HSC value 312 are the head number.

In order to define a servo defect table scheme, the HSC value 312 is divided into two components that may each be allocated 16 bits: a Virtual Track Number (VTN) 302 and a Virtual Servo Number (VSN) 304. Other bit allocations could also be used. A virtual track identified by a VTN represents a servo region that extends orthogonally to the data tracks on a disk surface. A single VTN includes all laterally (cross-track) adjacent servo sectors, each identified by a VSN, occupying a single servo region of the disk surface. The VSNs in a VTN will have consecutive HSC values. A major advantage of organizing the servo defects according to this scheme is that it easily allows for efficient servo defect table lookup operations, and also permits efficient identification of all laterally adjacent servo sectors associated with a defect. As indicated by way of summary above, this allows the notion of servo defect "width" to be used as basis for making determinations about servo reliability in relation to the degree of uncertainty in transducer position.

FIG. 4 shows the organization of an exemplary servo defect table resource, indicated generally at 400. The servo defect locations are stored in two tables, namely, a Virtual Track Table (VTT) 402 and a Virtual Servo Table (VST) 403. Each table is preferably implemented as an indexed array for fast access. The VST 403 stores VSN values in 16-bit VSN memory locations for all defective servo sectors. Note that this memory size is based on the disk geometry assumptions made above in regard to FIG. 3, and could therefore be larger or smaller for other drives. The VST memory locations form a VST value column 404. A VST address column 405 lists the table addresses (e.g., array index values), starting from the beginning of the VST 403, where the VSN values of the VST value column 404 are stored. In FIG. 4, there are assumed to be a total of "M" defective servo sectors having VST table address values of VST[0] through VST[M-1]. Five table addresses are specifically shown; namely: addresses VST[0], VST[1], VST[2], VST[3] and VST[M-1]. Five VSN values are respectively stored at these VST address locations, namely, VSN value "a" at VST[0], VSN value "b" at VST[1], VSN value "c" at VST[2], VSN value "d" at VST[3], and a VSN value "m" at VST[M-1].

The VTT 402 stores information about the VTNs and is shown to contain N entries (having VST table addresses VTT[0] to VTT[N-1]), where N is the number of virtual tracks (servo regions) on the drive. According to the disk drive geometry assumptions made in regard to FIG. 3, the VTN is an 11-bit value, therefore there can be up to $2^{11}$ (i.e., 2048) entries corresponding to all of the servo regions for all of the heads of the drive. The VTT 402 uses each VTN value as a VTT table address (e.g., an array index value) such that rapid VTT table lookups can be performed simply by knowing the VTN. These addresses are listed in VTT address column 407. Six specific VTT table addresses are shown; namely: addresses VTT[0], VTT[1], VTT[2], VTT[3], VTT[N-2] and VTT[N-1].

Except for the VTT[N-1] entry, which is used to store a "last defect" value indicating that there are no further defects, each VTT[] entry contains an address value identifying a specified VST table entry. These addresses are listed in the VTT value column 406. Each VTT address value represents the VST table address of the first defective VSN on the virtual track specified by the VTN associated with the address value. The number of defects on a VTN is the difference between its address value stored in the VTT value column 406 and the address value stored for the next VTN. If the values are the same, there are no defects on the VTN. By way of example, in VTT 402, the address value for VTN 0 (stored at VTT[0]) is 0, and the address value for VTN1 (stored at VTT[1]) is the same, indicating that there are no defects on VTN 0. The address value for VTN 2 (stored at VTT[2]) is 1, so there is 1–0=1 defective VSN on VTN 1 at location VST[0]=a. The address value for VTN 3 (stored at VTT[3]) is 3, so there are 3–1=2 defective VSNs on VTN 2, with the first at VST[1]=b and the second at VST[2]=c. This process of computing the defect locations may be continued for all VTNs. A "last defect" value in the VTT value column 406 is used to indicate that there are no further defects on any VTN.

Figure 5:
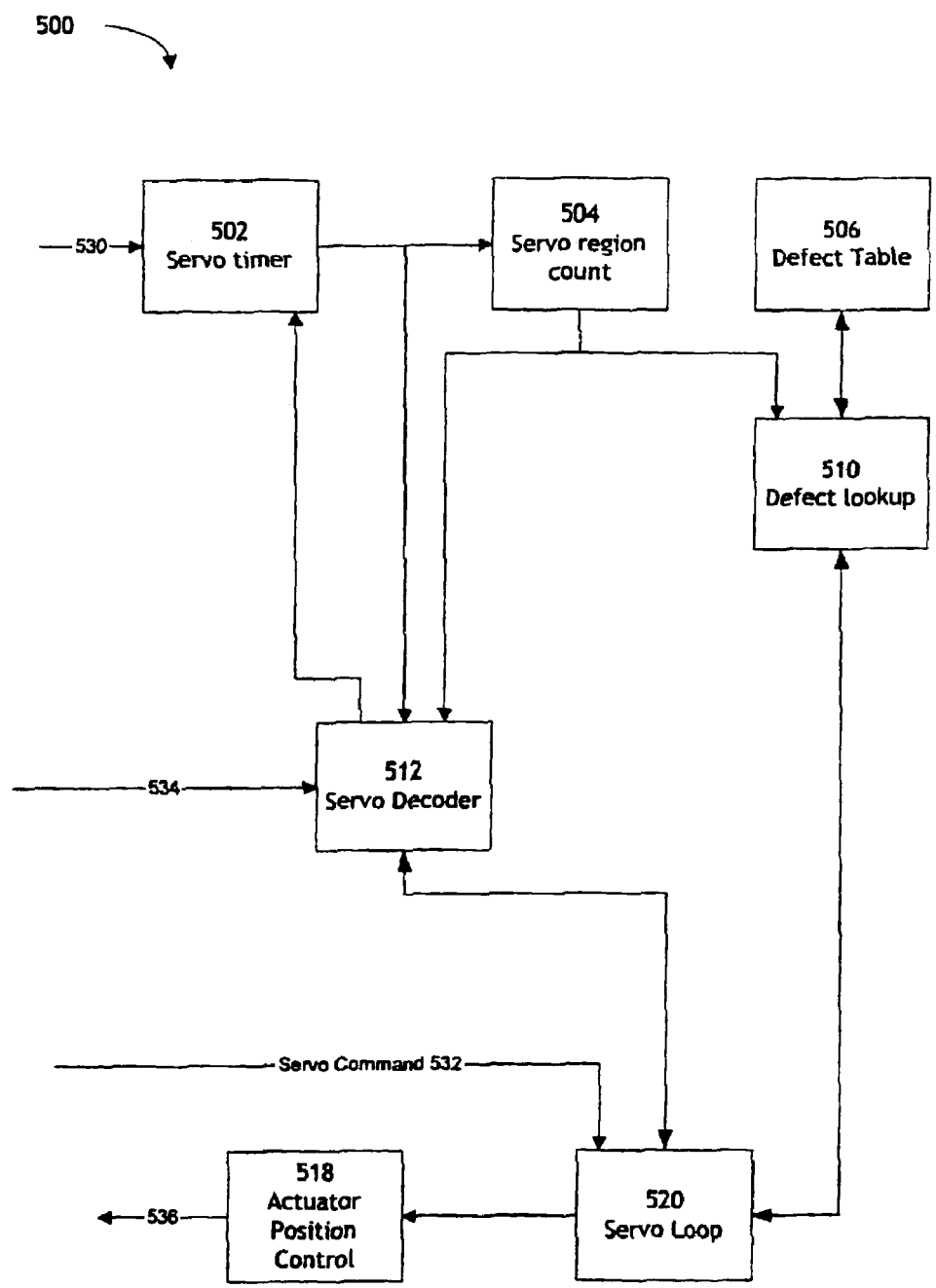
FIG. 5 shows a block diagram of exemplary servo defect management components constructed in accordance with the invention.

FIG. 5 shows exemplary functional components within the servo control circuit 122 (see FIG. 1) that can be used to manage servo defects during servo operations. This circuitry is generally indicated at 500. The components of FIG. 5 include a servo timer 502, a servo sector counter 504, a servo defect table resource 506, defect lookup logic 510, a servo decoder 512, servo loop logic 520 and actuator position control logic 518.

The servo timer 502 is adapted to receive timing information 530 recovered from a servo sector as it passes under the transducer 110 (see FIG. 1). The timing information 530 is used by the servo timer 502 to conventionally generate a signal that indicates the start of the servo sector. The servo sector start signal is provided to the servo sector count logic 504, which is adapted to determine the servo number relative to a predefined servo index. The servo sector count information is provided to the servo decoder 512 and to the defect lookup logic 510. The servo decoder 512 is adapted to decode servo sector information 534 read by the R/W channel 120 (see FIG. 1) to a format which is usable by the servo loop logic 520. The servo decoder 512 also receives the servo sector start signal from the servo timer 502. The decoded servo information generated by the servo decoder 512 is sent to the servo loop logic 520. The servo decoder 512 also sends recovered timing information to the servo timer 502.

The servo loop logic 520 is responsive to servo command input 532 (e.g. seek, settle, track follow) and is adapted to control the position of the actuator 108 (see FIG. 1) according to the specified servo mode. In particular, the servo loop logic 520 processes decoded servo information from the servo decoder 512 to determine the position of the transducer, and generates servo control outputs. The servo control outputs are sent to the actuator position control circuit 518, and are then output at 536 to the voice coil motor 112 (see FIG. 1) to effect corrections (as necessary) in the position of the actuator 108 (see FIG. 1).

If the servo sector being read is one without any error (see below) its position information is deemed valid and is used to generate the servo control outputs. To determine whether a servo sector is defective, such that its position information should be regarded as invalid, the servo loop logic 520 uses information obtained from the servo defect table resource 506. To perform a defect table look-up, the current servo sector's address information (cylinder number, head number, servo sector number) and a search width value are sent to the defect lookup logic 510. The search width is determined from the most current servo command input 532 and the allowable uncertainty in estimated transducer position. For example, during a track follow operation, the search width may be one track, while at a maximum velocity seek it may be much larger, such as ten tracks. The search width is used to determine if a defect lies within a specified cross-track range of position uncertainty for the servo region containing the current servo sector. If there is a defect within the search width, the servo loop logic 520 may decide to ignore the current servo sector.

The defect lookup logic 510 is adapted to search the servo defect table resource 506 for servo defects in the search width range, and return the results to the servo loop 520 (or any other desired component). The defect table resource 506 may be assumed to implement the VTT 402 and the VST 403 as described above. The servo loop logic 520 can use the defect information generated from the defect table resource 506 (e.g., a generated defect bit map) in various ways, such as to choose between reading position information from the current servo sector or using estimated position information based on a previous known good servo sector. The servo loop logic 520 may even inhibit all reading of the servo sector by communication with the servo decoder 512 when it is possible that reading the defect will cause problems for the channel state (e.g. massive gain change, incorrect servo timing). Note that if the current servo sector is not read, then the servo timer 502 will not receive a timing update from the servo decoder 512.

The defect table resource 506 can be maintained within the memory 126 (see FIG. 1) during drive operation. In addition, servo defect information for building the defect table resource 506 is preferably kept in a reserved area on the storage medium, as shown by way of example at 540 in FIG. 1. This information could be stored as a list of defective servo sectors, or it could be maintained in any other desired format (such as a compressed format). The stored servo defect information 540 will be read into the memory 126 at system start (or at media load time, in the case of removable media). If desired, multiple copies of the servo defect information 540 may be kept on the storage medium for reliability.

It is also beneficial to allow newly discovered defects to be added to the defect table resource 506. This can be accomplished by determining the HSC value for a new servo defect as described above. The VTN and VSN values can then be computed from the HSC and appropriate entries loaded into the VTT 402 and the VST 403. Adding a new defect will typically involve shifting all the subsequent VSN values in the VST 403 by address, and readjusting the VTT address value entries accordingly. In a case where defect width information is stored in the servo defect table resource 506 (see below), it may also be the case that a new defect can increase the width of an existing defect, and the VST 403 will be adjusted accordingly. Another method for adding new defects is to keep two defect lists, an original list and a grown list. These may be kept in any format, such as lists of HSCs. When creating a new servo defect table resource, the defect lists can be merged prior to generating the VST and VTT tables.

Figure 6:
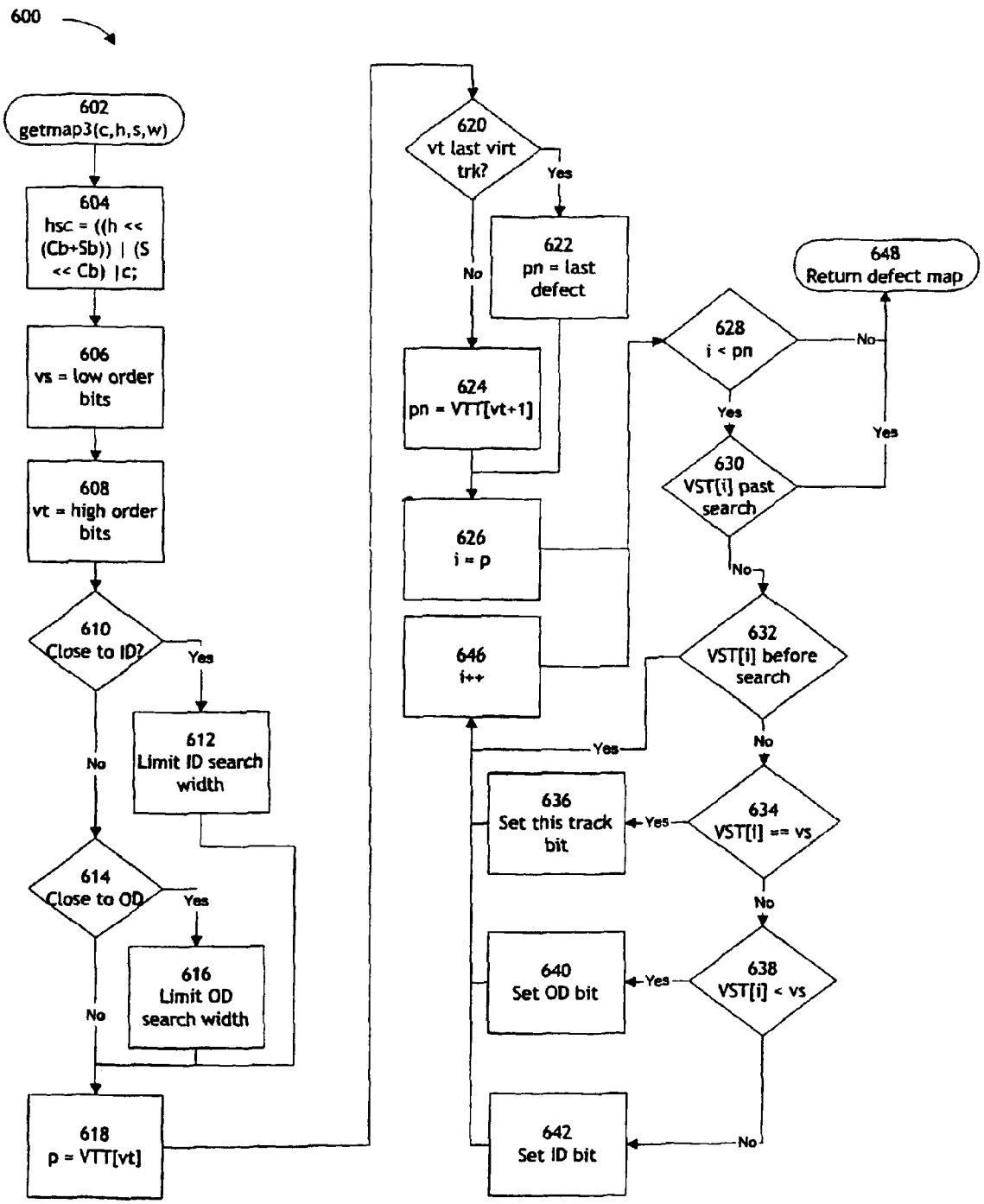
FIG. 6 is a flow diagram detailing an exemplary method for searching a servo defect table resource for a predetermined media location and returning servo defect information in accordance with the invention.

Turning now to FIG. 6, an exemplary method 600 is shown that may be employed by the defect look-up logic 510 (or other suitable entity) for performing a servo defect search for a target disk media location. The following definitions will be used in describing the method of FIG. 6: Cb is the number of bits in the cylinder number; Sb is the number of bits in the servo sector number (number of servo sectors per revolution); and Hb is the number of bits in the head number. Additional definitions (used for specifying servo sector location information), are: c, the target cylinder number; h, the target head number and s, the target servo sector number. Because the lookup operation is typically performed during various servo operations, such as track following, settling and seeking, the precise track location is not known. Therefore, as discussed above, it is beneficial to search for defects to within a search width corresponding to the uncertainty of the transducer position. The parameter w is defined to indicate the width of the search.

The method begins at step 602, with inputs of (c,h,s,w) that may be assumed to be provided by the servo sector counter 504 (c, h, and s) and the servo loop logic 520 (w) for the current (target) servo sector. At step 604, the c, h and s values are combined to form an hsc address value, as illustrated in FIG. 5. In particular, as shown in block 604 of FIG. 6, the h component of the address is formed by left shifting h by (Cb+Sb) bits, the s component is formed by left shifting s by Cb bits and c remains the same. At step 606, a VSN for the current servo sector is computed using the 16 low order bits of the hsc value, as shown in FIG. 3. At step 608, a VTN for the current servo sector is computed using the 11 remaining high order bits of the hsc value, as also shown in FIG. 3. At step 610, the search width w is checked against the current servo sector's VSN to determine if the range would extend past the ID (Inner Diameter) limit of the disk, and the search range to the ID is limited at step 612 if necessary. Otherwise, at step 614 the search range w is checked against the OD (Outer Diameter) limit of the disk, and the search range to the OD is limited at step 616 if necessary.

The defect lookup logic 510 is now ready to perform a table lookup using the current servo sector's VSN to determine if the current servo sector is defective or if other VSNs within the search range w of the current servo sector's VSN (on the same VTN) are defective. As indicated, the defect table 506 is assumed to be implemented using the VTT 402 and the VST 403 of FIG. 4. At step 618, a variable "p" is set to the address value in VTT value column 406 for the current VTN at VTT address (VTT[vt]. At step 620, a check is made to see if this is the last VTN in the VTT 402. If it is, at step 622 a variable "pn" is set to the "last defect" value in VTT value column 406. Otherwise, at step 624, the variable "pn" is assigned to the address value in the VTT value column 406 that corresponds to the next VTN at VTT address VTT[vt+1]. Any servo defects must lie in this range on the current VTN.

The search of the defect table resource 506 and the determination of possible defect information begins at step

626, starting with a search index value "i" being set to the address variable p as defined above. The process entails a search of the VST 403 between VST addresses VST[p] and VST[pn] to identify servo defects within the search width w of the current servo sector's VSN. At step 628, the index i is checked against pn to see if the search has ended. If it has, any servo defect information determined from the search is returned at step 648. If there were no defects in the search range, the return information will be null. If the search continues because i<pn at step 628, then at step 630 the VST value column 404 is checked at VST[i] to determine if the entry at this table location is past the search width w, i.e., VST[i]>VSN+w, where VSN is the current servo sector. If it is, this means that there are no more defects on the current VTN that are within the search width, so the search may be terminated and control passed to step 648. At step 632, the VST value column 404 is checked at VST[i] to determine if the entry at this table location is prior to the search width w, i.e., VST[i]<VSN−w, where VSN is the current servo sector. If it is, this means that additional VST table entries must be checked and control is passed to step 646, where the index i is incremented and the search continues at step 628.

If step 634 is reached, it means that a servo defect within the search range has been found. At this point, servo defect information may be constructed for return to the servo loop logic 520 (or other suitable location). The defect information can be generated in any convenient form. One possibility is a bit-map in which each bit represents a servo sector within the search width w, and is set to either "1" or "0" depending on whether or not the servo sector is defective. By way of example, if the search width w is plus or minus 5 tracks, for a total of 11 servo sectors, then a 16-bit register could be used to hold the defect bit map. Steps 634–642 show how a servo defect map may be constructed. At step 634, the VST table entry at VST[i] is tested to see if it is the VSN of the current servo sector (vs). If it is, then the defect bitmap is updated with this information at step 636, e.g., by setting the bit for this servo sector. At step 638, if the VST table entry at VST[i] is less than current servo sector's VSN, it is assumed to represent the OD of the defect, and at step 640 this information is added to the defect bitmap. At step 642, the VST table entry at VST[i] is greater than the current servo sector's VSN, and is assumed to represent the ID of the defect. This information is also added to the defect bitmap.

There are many useful variations for the system and method described above. For example, while the above description is shown for the case where the number of bits in the cylinder number is less than the number of bits in the VSN (see FIG. 3), it will be apparent that the above method can be easily modified to handle any maximum cylinder number. It may also be useful to reserve a portion of each VST table entry to hold information other than the VSN of a defective servo sector. For example, it may be possible to significantly reduce the size of the VST 403 and the VSNs stored therein when the average width of a defect is greater than one (data) track. In general, this is likely to be the case, because an error in a given PES will generally be visible at adjacent (data) track locations. In such a case, a subset of the bits in each VST table entry could be used to encode the width of a defect. If "k" bits of the VSN are reserved for encoding the defect width, then using a simple linear width allows for $2^k$ width values. Because a defect has a minimum width of 1, it is more efficient to encode the width as $1+2^k$, where a value of k=0 (no bits reserved for encoding defect width) implies a defect width of 1. At k=1 (1 bit reserved for encoding defect width), a defect can have a width of 1 or 3 tracks, depending on whether the defect width bit is set to "0" or "1." For situations where a value of 2 tracks is desirable as the minimum defect width, an encoding scheme of $2+2^k$ could be used. At k=1, a defect can have a width of 2 or 4 tracks, depending on whether the defect width bit is set to "0" or "1." Other encoding methods would also be possible, including varying the defect encoding as a function of the head number, cylinder number etc., where the defect statistics are not uniform over the surface. For example, assigning more defect width bits decreases the penalty for wide defects, but can increase the impact of smaller defects. It is therefore worthwhile to optimize the width encoding for the anticipated defect statistics. Finally, it should be noted that a default width other than one (data) track could be chosen without using any width bits, such as determining that the width of a defect is always three (data) tracks, or by readjusting the apparent cylinder width. For example, the cylinder number used to map the servo defects could be a function of the actual cylinder number, such as the actual cylinder number divided by two. The servo defect lookup method of FIG. 6 (described above) can be modified to accommodate any of these changes. Widths larger than one track are handled by ensuring the search range covers all entries that might have defects in the range.

A further useful modification of the above described system and method would be to store correction factors associated with the servo defects. There may be cases where the defect in a servo sector can be corrected instead of being marked as defective. For example, an error introduced during the creation of the servo pattern might be correctable in such a fashion. The correction factors could be stored in association with the VST.

A still further modification would be to include information on the type or location of the defect within the servo sector(s). Such information might include which field the defect is in, i.e., the PES field, the TID field, the STM, etc. A defect that affects only the PES field would allow for the servo decoder 512 to read the information in the other fields, such as the STM.

It will also be appreciated that other servo defect table formats could be used, although the format disclosed above is believed to provide a highly efficient arrangement for rapid servo defect lookups during servo control operations. The advantages of the disclosed servo defect table can be seen by comparison with other possible servo defect information storage schemes, such as a simple list of defects. Assume, for example, that a storage device has 27 bits of servo addressing (e.g. the number of servos is up to $2^{27}$), as shown in FIG. 3, and the number of defects is roughly 32K, with a mean width of three (data) tracks. Table 1 below compares the memory requirements for storing the defect information using a number of servo defect mapping methods. The first column of Table 1 lists the mapping methods, and the second column lists the memory required.

The first row of Table 1 corresponds to a defect storage method in which servo defects are stored as a simple list of the defective servo locations. The memory requirement would be 128 KB in this example, assuming four bytes are used for each of the 32K defects. In addition to the large memory footprint, such an organization makes defect lookups rather inefficient.

The second row of Table 1 shows the substantial reduction in the memory required when using the preferred embodiment of the invention with a fixed defect width of 1, and two bytes per defect. The memory footprint of 68 KB is based on the memory requirements of the VST 403 and the VTT 402.

At two bytes per VSN and 32K VSNs, the VST table size is 32K×2=64 KB. Insofar as 16 bits of the HSC 312 (see FIG. 3) are allocated to the VSNs, and the total number of HSC bits is 27, there are 27−16=11 bits for the VTNs and thus $2^{11}$ (2048) possible VTNs. With each VTN being allocated 2 bytes in the VTT 402, there needs to be 2×2048=4 KB of memory to store the VTT 402. The total memory requirement is thus 64 KB+4 KB=68 KB.

The third row of Table 1 shows a further reduction when a 1-bit defect width value is supported. Here, only 30 KB are required because the VST 403 is reduced to ⅓ its original size or roughly 22 KB (assuming the average defect is 3 tracks wide). With one bit of the VSN being used for width, the VSN now has only 15 bits. There are 27−15=12 bits available for the VTNs and thus $2^{12}$ (4096) possible VTNs. With each VTN being allocated two bytes in the VTT 402, there needs to be 2×4096=8 KB of memory to store the VTT 402. The total memory requirement is thus 32 KB+8 KB=30 KB.

TABLE 1

Memory requirements for defect mapping.

| Mapping method | Memory required |
| --- | --- |
| Simple list | 128 KB |
| Preferred method, fixed width of 1 | 68 KB |
| Preferred method, 1 bit width | 30 KB |

There are also ways in which defect table lookups can be minimized, so storage processing resources are utilized more efficiently. By way of example, during a track following servo mode, it may be expedient to perform a single defect table lookup for all servo sectors in a single data track, and return a bitmap or the like that identifies servo defects found in the track. The servo defect information could be stored in a cache and each servo sector along the data track could then be checked for defects by consulting the cache rather than performing a servo defect table lookup for each servo sector.

Accordingly, an exemplary system and method for managing servo defects in a data storage device have been disclosed. While various embodiments of the invention have been described, it should be apparent that many variations and alternative embodiments could be implemented in accordance with the invention. It will be understood, therefore, that the invention is not to be in any way limited except in accordance with the spirit of the appended claims and their equivalents.

What is claimed is:

1. A method for managing servo defects in a data storage device, comprising:
   identifying a servo sector recorded on a data storage medium;
   performing a lookup in a servo defect table resource to determine whether said servo sector contains defective servo information;
   taking a responsive servo control action if said servo sector is found to contain defective servo information; and
   wherein said data storage medium has data tracks and servo regions comprising servo sectors oriented in a cross-track direction and said servo defect table resource organizes servo defects by servo region.

2. A method in accordance with claim 1 wherein said servo defects are organized by servo region by grouping servo defects corresponding to a single servo region in said servo defect table resource.

3. A method in accordance with claim 1 wherein said servo defect table resource is organized so that servo defects corresponding to a single servo region can be accessed by identifying the single servo region.

4. A method in accordance with claim 1 wherein said servo defect table resource comprises a first servo defect table resource portion that identifies servo regions and a second servo defect table resource portion that identifies servo defects grouped by servo region, and wherein said first servo defect table resource portion correlates said servo regions with said servo defects in said second servo defect table resource portion to facilitate servo defect lookups by servo region.

5. A method in accordance with claim 1 wherein said servo defect table resource organizes defective servo sectors using an HSC servo sector addressing format to minimize table lookup time, said servo sector addressing format being based on sector addresses defined as numeric values whose most significant elements represent a head number H, whose next lower significant elements represent a servo sector number S along a data track, and whose least significant bits represent a cylinder number C.

6. A method in accordance with claim 5 wherein each of said HSC addresses defines a virtual track number representing a first field containing most significant numeric values of said HSC address and a virtual servo number representing a second field containing least significant numeric values of said HSC address.

7. A method in accordance with claim 6 wherein each of said virtual track numbers corresponds to a virtual servo track that represents a region of servo sectors extending generally orthogonally across data tracks on said medium, and each of said virtual servo numbers corresponds to a servo sector located in one of said virtual servo tracks.

8. A method in accordance with claim 7 wherein said servo defect table resource is organized hierarchically by way of said virtual track numbers and said virtual servo numbers, with each of said virtual servo numbers being associated with one of said virtual track numbers and each of said virtual track numbers being associated with 0 to N-1 virtual servo numbers, where N is a maximum number of servo sectors that may exist on a virtual servo track defined by a virtual track number, whereby servo sectors that are defective due to a defect along a virtual servo track have virtual servo numbers stored in adjacent locations in said servo defect table resource.

9. A method in accordance with claim 8 wherein said servo defect table resource comprises a Virtual Track Table (VTT) and a Virtual Servo Table (VST).

10. A method in accordance with claim 9 wherein said VTT stores virtual track numbers (VTNs) corresponding to virtual servo tracks in association with an address value corresponding to a VST table address in said VST.

11. A method in accordance with claim 10 wherein said VST stores virtual servo numbers (VSNs) corresponding to defective servo sectors at selected VST table addresses.

12. A method in accordance with claim 11 wherein a difference in a first address value associated with a first VTN in said VTT and a second address value associated with a second VTN that is adjacent to said first VTN in said VTT represents a number of VSNs associated with said first VTN.

13. A method in accordance with claim 11 wherein said VST stores information about servo defect width that is optimized for anticipated servo defect statistics.

14. A method in accordance with claim 13 wherein said servo defect width information is stored as a defect width value.

15. A method in accordance with claim 13 wherein said servo defect width information is stored by defining said VSNs according to HSC addresses in which each cylinder number C represents more than one actual cylinder on said medium.

16. A method in accordance with claim 1 wherein said servo defect table resource stores information about servo defect width that is optimized for anticipated servo defect statistics.

17. A method in accordance with claim 1 wherein said servo defect table resource stores detailed defect information that includes information about a cause or location of servo sector defects.

18. A method in accordance with claim 1 wherein said servo defect table resource stores correction factors for correcting servo information errors caused by servo sector defects.

19. A method in accordance with claim 1 wherein a lookup in said servo defect table resource includes identifying said servo sector and a current servo mode.

20. A method in accordance with claim 19 wherein said current servo mode is used to specify a search width that defines a range of servo sectors to be checked in said servo defect table resource.

21. A method in accordance with claim 20 wherein a smallest search width is used for a track following servo mode, a next larger search width is used for a settle servo mode, and a largest search width is used for a seek servo mode.

22. A method in accordance with claim 1 wherein said defective servo information resulting from a servo table lookup is contained in a bit map that identifies whether said servo sector contains a servo defect.

23. A method in accordance with claim 22 wherein said bit map further identifies whether servo sectors that are adjacent to said servo sector in a direction that is generally orthogonal to data tracks on said medium are also defective.

24. A method in accordance with claim 23 wherein said bit map has a size that represents a search width which is varied depending whether said servo sector was detected during a track following servo mode, a settle servo mode, or a seek servo mode.

25. A method in accordance with claim 1 wherein said responsive servo control action includes using estimated servo information if said servo sector is found to contain defective servo information.

26. A method in accordance with claim 1 wherein said servo defect table resource is stored in random access memory and servo defect table information for building said servo defect table resource is stored at one or more locations on said medium.

27. A method in accordance with claim 1 further including adding to said servo defect table resource as new servo defects are discovered during operation of said data storage device.

28. In a data storage device, a servo defect management system comprising:
means for identifying a servo sector recorded on a data storage medium;
means for performing a lookup in a servo defect table resource to determine whether said servo sector contains defective servo information;
means for taking a responsive servo control action if said servo sector is found to contain defective servo information; and
wherein said data storage medium has data tracks and servo regions comprising servo sectors oriented in a cross-track direction, and said servo defect table resource organizes servo defects by servo region.

29. A system in accordance with claim 28 wherein said servo defects are organized by servo region by grouping servo defects corresponding to a single servo region in said servo defect table resource.

30. A system in accordance with claim 28 wherein said servo defect table resource is organized so that servo defects corresponding to a single servo region can be accessed by identifying the single servo region.

31. A system in accordance with claim 28 wherein said servo defect table resource comprises a first servo defect table resource portion that identifies servo regions and a second servo defect table resource portion that identifies servo defects grouped by servo region, and wherein said first servo defect table resource portion correlates said servo regions with said servo defects in said second servo defect table resource portion to facilitate servo defect lookups by servo region.

32. A system in accordance with claim 28 wherein said servo defect table resource organizes defective servo sectors using an HSC servo sector addressing format to minimize table lookup time, said servo sector addressing format being based on sector addresses defined as numeric values whose most significant elements represent a head number H, whose next lower significant elements represent a servo sector number S along a data track, and whose least significant bits represent a cylinder number C.

33. A system in accordance with claim 32 wherein each of said HSC addresses defines a virtual track number representing a first field containing most significant numeric values of said HSC address and a virtual servo number representing a second field containing least significant numeric values of said HSC address.

34. A system in accordance with claim 33 wherein each of said virtual track numbers corresponds to a virtual servo track that represents a region of servo sectors extending generally orthogonally across data tracks on said medium, and each of said virtual servo numbers corresponds to a servo sector located in one of said virtual servo tracks.

35. A system in accordance with claim 34 wherein said servo defect table resource is organized hierarchically by way of said virtual track numbers and said virtual servo numbers, with each of said virtual servo numbers being associated with one of said virtual track numbers and each of said virtual track numbers being associated with 0 to N-1 virtual servo numbers, where N is a maximum number of servo sectors that may exist on a virtual servo track defined by a virtual track number, whereby servo sectors that are defective due to a defect along a virtual servo track have virtual servo numbers stored in adjacent locations in said servo defect table resource.

36. A system in accordance with claim 35 wherein said servo defect table resource comprises a Virtual Track Table (VTT) and a Virtual Servo Table (VST).

37. A system in accordance with claim 36 wherein said VTT stores virtual track numbers (VTNs) corresponding to virtual servo tracks in association with an address value corresponding to a VST table address in said VST.

38. A system in accordance with claim 37 wherein said VST stores virtual servo numbers (VSNs) corresponding to defective servo sectors at selected VST table addresses.

39. A system in accordance with claim 38 wherein a difference in a first address value associated with a first VTN in said VTT and a second address value associated with a second VTN that is adjacent to said VTT represents a number of VSNs associated with said first VTN.

40. A system in accordance with claim 38 wherein said VST stores information about servo defect width that is optimized for anticipated servo defect statistics.

41. A system in accordance with claim 40 wherein said servo defect width information is stored as a defect width value.

42. A system in accordance with claim 40 wherein said servo defect width information is stored by defining said VSNs according to HSC addresses in which each cylinder number C represents more than one actual cylinder on said medium.

43. A system in accordance with claim 28 wherein said servo defect table resource stores information about servo defect width that is optimized for anticipated servo defect statistics.

44. A system in accordance with claim 28 wherein said servo defect table resource stores detailed defect information that includes information about a cause or location of servo sector defects.

45. A system in accordance with claim 28 wherein said servo defect table resource stores correction factors for correcting servo information errors caused by servo sector defects.

46. A system in accordance with claim 28 wherein said means for performing a lookup includes means for identifying said servo sector and a current servo mode.

47. A system in accordance with claim 46 wherein said current servo mode is used to specify a search width that defines a range of servo sectors to be checked in said servo defect table resource.

48. A system in accordance with claim 47 wherein a smallest search width is used for a track following servo mode, a next larger search width is used for a settle servo mode, and a largest search width is used for a seek servo mode.

49. A system in accordance with claim 28 wherein said defective servo information resulting from a servo table lookup is contained in a bit map that identifies whether said servo sector contains a servo defect.

50. A system in accordance with claim 49 wherein said bit map further identifies whether servo sectors that are adjacent to said servo sector in a direction that is generally orthogonal to data tracks on said medium are also defective.

51. A system in accordance with claim 50 wherein said bit map has a size that represents a search width which is varied depending whether said servo sector was detected during a track following servo mode, a settle servo mode, or a seek servo mode.

52. A system in accordance with claim 28 wherein said responsive servo control action includes using estimated servo information if said servo sector is found to contain defective servo information.

53. A system in accordance with claim 28 wherein said servo defect table resource is stored in random access memory and servo defect table information is stored at one or more locations on said medium.

54. A system in accordance with claim 28 further including means for adding to said servo defect table resource as new servo defects are discovered during operation of said data storage device.

55. A system in accordance with claim 28 wherein said data storage device is a disk drive.

56. A data storage medium having recorded thereon:
one or more data regions arranged in one or more data tracks;
one or more servo regions extending generally orthogonally to said data tracks;
each of said servo regions containing plural servo sectors;
servo defect information for building a servo defect table resource identifying servo sectors containing defective servo information; and
wherein said servo defect information organizes servo defects by servo region.

57. A data storage medium in accordance with claim 56 wherein said servo defect information is stored as a list of defective servo sectors.

58. A data storage medium in accordance with claim 56 wherein said servo defect information includes information about servo defect width that is optimized for anticipated servo defect statistics.

59. A data storage medium in accordance with claim 58 wherein said servo defect width information is stored as a defect width value.

60. A data storage medium in accordance with claim 56 wherein said servo defect information includes information about a cause or location of servo sector defects.

61. A data storage medium in accordance with claim 56 wherein said servo defect information includes correction factors for correcting servo errors caused by servo sector defects.

62. A data storage medium in accordance with claim 56 wherein said data storage medium is a magnetically encodable medium.

63. A data storage medium in accordance with claim 56 wherein said data storage medium is an optically encodable medium.

64. A data storage medium in accordance with claim 56 wherein said data storage medium is a magneto-optically encodable medium.

65. A data storage medium in accordance with claim 56 wherein said data storage medium is a non-removable medium.

66. A data storage medium in accordance with claim 56 wherein said data storage medium is a removable medium.

* * * * *